US012522758B2

(12) United States Patent
Sun et al.

(10) Patent No.: US 12,522,758 B2
(45) Date of Patent: Jan. 13, 2026

(54) COMPOSITIONS COMPRISING 2,3,3,3 TETRAFLUOROPROPENE AND METHODS FOR MAKING AND USING THE COMPOSITIONS

(71) Applicant: THE CHEMOURS COMPANY FC, LLC, Wilmington, DE (US)

(72) Inventors: Xuehui Sun, Kennett Square, PA (US); Karl Robert Krause, Kennett Square, PA (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 752 days.

(21) Appl. No.: 17/797,578

(22) PCT Filed: Feb. 5, 2021

(86) PCT No.: PCT/US2021/016693
§ 371 (c)(1),
(2) Date: Aug. 4, 2022

(87) PCT Pub. No.: WO2021/158837
PCT Pub. Date: Aug. 12, 2021

(65) Prior Publication Data
US 2023/0061454 A1 Mar. 2, 2023

Related U.S. Application Data

(60) Provisional application No. 62/971,347, filed on Feb. 7, 2020.

(51) Int. Cl.
C09K 5/04 (2006.01)
(52) U.S. Cl.
CPC ........ C09K 5/044 (2013.01); C09K 2205/122 (2013.01); C09K 2205/126 (2013.01)
(58) Field of Classification Search
CPC .................... C09K 5/044; C09K 2205/126
See application file for complete search history.

(56) References Cited

U.S. PATENT DOCUMENTS

| | | | |
|---|---|---|---|
| 7,708,903 B2 | 5/2010 | Sievert et al. | |
| 8,012,368 B2 | 9/2011 | Nappa et al. | |
| 8,070,976 B2 | 12/2011 | Nappa et al. | |
| 8,147,709 B2 | 4/2012 | Mahler et al. | |
| 8,333,902 B2 | 12/2012 | Mahler et al. | |
| 8,425,795 B2 | 4/2013 | Nappa et al. | |
| 8,692,037 B2 | 4/2014 | Mahler et al. | |
| 8,877,086 B2 * | 11/2014 | Mahler ................ | A62D 1/0028 62/529 |
| 8,911,640 B2 | 12/2014 | Nappa et al. | |
| 9,051,500 B2 | 6/2015 | Nappa | |
| 9,308,408 B2 | 4/2016 | Nappa | |
| 9,410,064 B2 | 8/2016 | Nappa et al. | |
| 9,486,657 B2 | 11/2016 | Mahler et al. | |
| 9,540,557 B2 | 1/2017 | Nappa et al. | |
| 9,637,429 B2 | 5/2017 | Sun | |
| 9,822,047 B2 | 11/2017 | Sun | |
| 9,890,311 B2 | 2/2018 | Nappa et al. | |
| 9,943,717 B2 | 4/2018 | Nappa | |
| 10,214,669 B2 | 2/2019 | Mahler et al. | |
| 10,246,389 B1 | 4/2019 | Wang | |
| 10,329,467 B2 | 6/2019 | Nappa et al. | |
| 10,351,495 B2 | 7/2019 | Sun | |
| 10,533,120 B2 | 1/2020 | Minor et al. | |
| RE47,862 E | 2/2020 | Mahler et al. | |
| 10,563,107 B2 | 2/2020 | Nappa et al. | |
| 10,584,082 B2 | 3/2020 | Sun | |
| 10,584,270 B2 | 3/2020 | Mahler et al. | |
| 10,688,329 B2 | 6/2020 | Nappa | |
| 10,815,173 B2 | 10/2020 | Sun | |
| 11,001,738 B2 | 5/2021 | Mahler et al. | |
| 11,046,876 B2 | 6/2021 | Nappa et al. | |
| 11,046,877 B1 | 6/2021 | Nappa et al. | |
| 11,124,685 B2 | 9/2021 | Nappa et al. | |
| 11,312,890 B2 | 4/2022 | Mahler et al. | |
| 11,331,525 B2 | 5/2022 | Nappa | |
| 11,332,424 B2 | 5/2022 | Sun | |
| 2007/0197842 A1 | 8/2007 | Mukhopadhyay et al. | |
| 2012/0065437 A1 | 3/2012 | Merkel et al. | |
| 2015/0028246 A1 | 1/2015 | Mahler et al. | |
| 2015/0183698 A1 | 7/2015 | Merkel et al. | |
| 2015/0241095 A1 | 8/2015 | Nappa | |
| 2015/0247675 A1 | 9/2015 | Nappa | |
| 2015/0322317 A1 | 11/2015 | Collier et al. | |
| 2016/0046548 A1 | 2/2016 | Bonnet et al. | |
| 2017/0166500 A1 | 6/2017 | Merkel et al. | |
| 2018/0093935 A1 | 4/2018 | Chaki et al. | |
| 2018/0127628 A1 | 5/2018 | Nappa et al. | |
| 2018/0370880 A1 | 12/2018 | Baba-Ahmed et al. | |
| 2019/0210944 A1 | 7/2019 | Wang et al. | |
| 2019/0210945 A1 | 7/2019 | Wang | |

(Continued)

FOREIGN PATENT DOCUMENTS

| | | |
|---|---|---|
| FR | 3046159 B1 | 12/2019 |
| WO | 2010059677 A2 | 5/2010 |
| WO | 2013119919 A1 | 8/2013 |
| WO | 2015053339 A1 | 4/2015 |
| WO | 201936049 A1 | 2/2019 |
| WO | 2019213004 A1 | 11/2019 |
| WO | 2020018764 A1 | 1/2020 |
| WO | 2020222864 A1 | 11/2020 |
| WO | 2020222865 A1 | 11/2020 |

OTHER PUBLICATIONS

1990 ASHRAE Handbook, Refrigeration Systems and Applications, Lubricants in Refrigeration Systems, 1990, Chapter 8, pp. 8.1-8.21, Atlanta, Georgia.
International Search Report and Written Opinion for PCT Application No. PCT/US2021/016693 mailed Aug. 19, 2021.
Synthetic Lubricants and High-Performance Functional Fluids, edited by Ronald L. Shubkin, 1993, New York, New York.

Primary Examiner — Peter F Godenschwager

(57) ABSTRACT

Disclosed are compositions comprising HCFC-244bb and/or HFO-1234yf and at least one additional compound. Compositions comprising HCFC-244bb are useful in processes to make HFO-1234yf. Compositions comprising HFO-1234yf are useful, among other uses, as heat transfer compositions for use in refrigeration, air-conditioning and heat pump systems.

18 Claims, No Drawings

(56) References Cited

U.S. PATENT DOCUMENTS

| | | |
|---|---|---|
| 2019/0292119 A1 | 9/2019 | Sun |
| 2020/0165181 A1 | 5/2020 | Baba-Ahmed |
| 2020/0230454 A1 | 7/2020 | Robin et al. |
| 2021/0355360 A1 | 11/2021 | Nappa et al. |
| 2022/0204828 A1 | 6/2022 | Mahler et al. |

* cited by examiner

COMPOSITIONS COMPRISING 2,3,3,3 TETRAFLUOROPROPENE AND METHODS FOR MAKING AND USING THE COMPOSITIONS

This Application is a 371 of International Application Number PCT/US21/16693 filed Feb. 5, 2021, which claims the benefit of Application No. 62/971,347 filed Feb. 7, 2020. The disclosure of Application No. 62/971,347 is hereby incorporated by reference.

BACKGROUND

Field of the Invention

The present disclosure relates to the field of compositions which may be useful as heat transfer compositions, aerosol propellants, foaming agents, blowing agents, solvents, cleaning agents, carrier fluids, displacement drying agents, buffing abrasion agents, polymerization media, expansion agents for polyolefins and polyurethane, gaseous dielectrics, extinguishing agents, and fire suppression agents in liquid or gaseous form. The present disclosure also relates to compositions and methods useful for making heat transfer agents. In particular, the present disclosure relates to compositions which may be useful as heat transfer compositions, such as 2,3,3,3-tetrafluoropropene (HFO-1234yf, or 1234yf).

Description of Related Art

US Pub No 2017/0166500 discloses processes and methods for manufacturing HFO-1234yf by dehydrohalogenating a reactant stream of 2-chloro-1,1,1,2-tetrafluoropropane that is substantially free of impurities; the disclosure of which is hereby incorporated by reference.

SUMMARY OF THE INVENTION

One embodiment of instant invention provides a composition comprising 1234yf, 1225zc, 1234ze-E, 1234ze-Z, 1243zf, 1140, Z-1225ye, E-1225ye, and HFC-134a.

The inventive composition can further comprise at least one additional compound. In one embodiment the additional compound comprises at least one member selected from the group consisting of 1131a, 244bb, 1233xf, 244cc, 1224yd, HFP, 1122, 1122a, 12, E-1131, Z-1131, 245cb, 3,3,3-trifluoropropyne, 124, 142b, 254eb, 347 isomers including 347mpy and 347mef and combinations thereof.

In one embodiment of the instant invention, the at least one additional compound or the foregoing additional compound further comprise at least one member selected from the group consisting of HFC-245cb, CFC-12, HCC-1140, HFC-254eb, HCFC-1122, HCFC-124, HCFC-142b, HCFC-151a, HFC-152a, and 3,3,3-trifluoropropyne.

In another embodiment of the instant invention, the at least one additional compound or the foregoing additional compounds further comprise at least one additional compound selected from the group consisting of HCFC-243db, HCFC-244db, HFC-245cb, HFC-245fa, HCFO-1233xf, HCFO-1233zd, HCFC-253fb, HCFC-234ab, HCFC-243fa, ethylene, HFC-23, CFC-13, HFC-143a, HFC-152a, HFC-236fa, HCO-1130, HCO-1130a, HFO-1336, HCFC-133a, HCFC-254fb, HCFC-1131, HFC-1141, HCFO-1242zf, HCFO-1223xd, HCFC-233ab, HCFC-226ba, and HFC-227ca.

In one embodiment of the invention, the composition contains greater than 0 and less than about 1 total weight percent of the at least one additional compound(s).

In another embodiment of the invention, the inventive composition comprising 1234yf and wherein the total amount of 1225zc, 1234ze, 1243zf, 1140, Z-1225ye, E-1225ye, and HFC-134a is greater than zero and less than 1 wt. %. In one aspect of this embodiment, the inventive composition comprising 1234yf and wherein the total amount of 1225zc, 1234ze, 1243zf, 1140, Z-1225ye, E-1225ye, HFC-134a and the at least one additional compound is greater than zero and less than 1 wt. %.

In another embodiment of the invention, the 347 isomers comprise at least one member selected from the group consisting of 347mpy and 347mef.

In another embodiment of the invention, the inventive composition further comprising at least one member selected from the group consisting of 32, 125 and 161.

In another embodiment of the invention, there is provided a composition comprising HCFC-244bb and at least one additional compound selected from the group consisting of 1120, 1334, 244cc, 1233xf, 1223xd, 1224, 225ba, 226ca, 233ab, 233da, 234bb, 234da, 235ca, 235da, 235ea, 243ab, 243db, 244db, 244eb, 253db, 253fb, 1224yd-E, 1233zd, 235cb, and 1224yd-Z, 1326, 1223 isomers and combinations thereof. In one aspect of this embodiment, the composition may contain anywhere from greater than zero weight percent to 99.99 weight percent of HCFC-244bb.

In one embodiment of the invention, compositions comprising 244bb can be employed for making the inventive 1234yf compositions. One aspect of this embodiment comprises a method for making the inventive 1234yf containing compositions by reacting any combination of the foregoing 244bb containing compositions. One specific as of this embodiment wherein the reacting comprises a dehydrochlorination reaction.

In one embodiment the inventive composition comprises a refrigerant comprising any combination of the foregoing compositions and at least one lubricant.

One embodiment of the invention comprises a method for transferring heat comprising using any combination of the foregoing refrigerant compositions as a working fluid in a heat transfer system. In one aspect, the method relates to a heat transfer systems comprise at least one member selected from the group consisting of air conditioners, freezers, refrigerators, heat pumps, water chillers, flooded evaporator chillers, direct expansion chillers, walk-in coolers, heat pumps, mobile refrigerators, mobile air conditioning units and combinations thereof.

Another embodiment of the invention comprises a container comprising any of the foregoing 1234yf containing compositions.

The embodiments of the invention can be used alone or in combinations with each other.

DETAILED DESCRIPTION

HFO-1234yf is useful as a refrigerant, heat transfer fluid, aerosol propellant, foam expansion agent, among other uses. HFO-1234yf also has a low global warming potential (GWP) as reported by V. C. Papadimitriou, et al. in Physical Chemistry Chemical Physics, 2007, volume 9, pages 1-13; hereby incorporated by reference. HFO-1234yf is useful for replacing the higher GWP saturated HFC refrigerants.

As used herein, the terms "comprises," "comprising," "includes," "including," "has," "having" or any other variation thereof, are intended to cover a non-exclusive inclusion.

For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method that includes materials, steps, features, components, or elements, in addition to those literally disclosed provided that these additional included materials, steps, features, components, or elements do materially affect the basic and novel characteristic(s) of the claimed invention, especially the mode of action to achieve the desired result of any of the processes of the present invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also include such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

One embodiment of instant invention provides a composition comprising 1234yf and remainder comprising up to 1 wt % 134a and in some cases greater than zero and less than about 0.5 wt % 134a; up to 100 ppmw 1140 and in some cases greater than zero and less than about 60 ppmw 1140; and up to 500 ppmw each of 1225zc, 1234ze, 1243zf, Z-1225ye, and E-1225ye and in some cases greater than zero and less than about 250ppmw of each of 1225zc, 1234ze, 1243zf, Z-1225ye and E-1225ye. In one aspect of this embodiment, the composition comprises: i) 1234yf, 134a, 1140 and 1225zc; ii) 1234yf, 134a, 1140 and at least one of 1234ze-E and 1234ze-Z; iii) 1234yf 134a, 1140 and 1243zf; iv) 1234yf, 134a, 1140 and at least one of Z-1225ye and E-1225ye; v) any combination of i) through iv) and further comprising at least one additional compound (described below), or vi) the combinations of v) wherein the total amount of 134a, 1140,1225zc, 1234ze-E and 1234ze-Z, 1243zf, Z-1225ye, E-1225ye and the additional compounds is greater than 0 and less than 1 wt. %.

The foregoing inventive compositions can further comprise at least one additional compound. In one embodiment the additional compound comprises at least one member selected from the group consisting of: i) greater than 0 up to 25ppmw, up to 250ppmw and, in some cases, up to 500 ppmw of one or more of 1131a, 1233xf, 1224yd, 1225zc, HFP, 1122, 1122a, E-1131, Z-1131, and 3,3,3-trifluoropropyne, and ii) up to 1% of one or more of 244bb, 244cc, 12, 245cb, 124, 142b, 254eb, 347 isomers including 347 mpy, 347mef and combinations thereof. In one aspect of this embodiment, the amount of the additional compound comprises greater than zero and less than about 250 ppmw of one or more of 1131a, 1233xf, 1224yd, HFP, 1122, 1122a, E-1131, Z-1131, and 3,3,3-trifluoropropyne. In another aspect of this embodiment, the amount of the additional compound comprises greater than zero and less than about 0.5% of one or more of 244bb, 244cc, 12, 245cb, 124, 142b, 254eb, 347 isomers including 347 mpy and 347mef.

In one embodiment of the instant invention, the foregoing compositions further comprise additional compounds comprising at least one member selected from the group consisting of HFC-245cb, CFC-12, HFC-254eb, HCFC-1122, HCFC-124, HCFC-142b, HCFC-151a, HFC-152a, 3,3,3-trifluoropropyne, 1122a-Z and combinations thereof. In one aspect of this embodiment, the amount of additional compounds comprises greater than zero and less than 500ppmw for fluoroolefinic compounds. In another aspect of this embodiment, the amount of an additional compound comprising 1140 is greater than zero and less than 100 ppmw. In a further aspect of this embodiment, the amount of additional compounds comprising saturated compounds is greater than zero and less than 1% and, in some cases, greater than zero and less than 0.5% by weight.

In another embodiment of the instant invention, the foregoing compositions further comprise additional compounds comprising at least one additional compound selected from the group consisting of HCFC-243db, HCFC-244db, HFC-245cb, HFC-245fa, HCFO-1233xf, HCFO-1233zd, HCFC-253fb, HCFC-234ab, HCFC-243fa, ethylene, HFC-23, CFC-13, HFC-143a, HFC-152a, HFC-236fa, HCO-1130, HCO-1130a, HFO-1336, HCFC-133a, HCFC-254fb, HCFC-1131, HFC-1141, HCFO-1242zf, HCFO-1223xd, HCFC-233ab, HCFC-226ba, and HFC-227ca. In one aspect of this embodiment, the amount of additional compounds comprises greater than zero and less than 500ppmw for fluoroolefinic compounds. In another aspect of this embodiment, the amount of additional compounds comprising saturated compounds is greater than zero and less than 1% and, in some cases, greater than zero and less than 0.5% by weight.

In one embodiment of the invention, the foregoing compositions contains greater than 0 and less than about 1 total weight percent of the at least one additional compound(s). In another embodiment of the invention, the foregoing compositions contain greater than 0 and less than 0.5, greater than 0 and less than 0.2 and, in some cases, greater than 0 and less than 0.1 total weight percent of the at least one additional compound(s).

In the foregoing 1234yf containing composition embodiments, the additional compounds can provide a wide range of benefits. Examples of such benefits include reduced flammability, for example, when using additional compounds such as 347 isomers, 1224yd, 1233xf, 244bb, 244cc, 245cb, HFP 134a, 1225ye and 1225zc. When the additional compounds comprise a chlorinated compound, the additional compounds can impart improved lubricity and provide protection to the compressor by binding to and passivating metal surfaces. Further certain chlorinated compounds can impart improved chemical stability such as 1224yd, 1233xf, 244bb, and 244cc can increase 1234yf stability by reducing the polymerization as acting as chain transfer agent. In addition, certain additional compounds can impart improved miscibility with lubricating oils as well as aid in leak detection. Certain additional compounds can also impart improved refrigeration performance such as trifluoropropyne which has a lower boiler point than 1234yf.

In another embodiment of the invention, there is provided a composition comprising HCFC-244bb and at least one additional compound selected from the group consisting of 1120, 1334, 244cc, 1233xf, 1223xd, 1224, 225ba, 226ca, 233ab, 233da, 234bb, 234da, 235ca, 235da, 235ea, 243ab, 243db, 244db, 244eb, 253db, 253fb, 1224yd-E, 1233zd, 235cb, and 1224yd-Z, 1326, 1223 isomers including 1223xd and combinations thereof. In one aspect of this embodiment, the composition may contain anywhere from greater than zero weight percent to 99.99 weight percent of HCFC-244bb. In one aspect of this embodiment, the amount of additional compounds ranges from greater than zero to less than 1% by weight and, in some cases, greater than zero and less than 0.5% by weight. In another aspect of this embodiment, the amount of additional compound comprising 1224yd is greater than zero and less than 2% by weight and, in some cases, greater than zero and less than 1% by weight. In a further aspect of this embodiment, the amount of additional compound comprising 1233xf is greater than zero and less than 5% by weight and, in some cases, greater than zero and less than 2.5% by weight.

In one embodiment, the HCFC-244bb containing composition can be prepared by blending components of the composition. In another embodiment, the HCFC-244bb containing composition is produced by: i) hydrofluorinating 1233xf in the liquid phase using an antimony catalyst; ii) purified to remove unreacted HF and some organic byproducts and iii) optionally blending additional components of the composition to 244bb containing reaction product.

In one embodiment of the invention, compositions comprising 244bb can be employed for making the inventive 1234yf compositions. While the 244bb containing compositions can be used in any suitable process for making 1234yf, one example of such a process is disclosed by US 20150315108; the disclosure of which is hereby incorporated by reference.

In the foregoing 244bb containing compositions, the additional compounds can provide a wide range of benefits. For example, additional compounds comprising at least one of 1120, 1334, 244cc, 1223xd, 1224, 225ba, 226ca, 233ab, 233da, 234bb, 234da, 235ca, 235da, 235ea, 243ab, 243db, 244db, 244eb, 253db, 253fb, 1224yd-E, 1233zd, 235cb, and 1224yd-Z, 1326, 1223 isomers including 1223xd can function as a solvents including functioning as a solvent to increase 244bb dehydrochlorination with caustic. In one aspect, a composition comprising at least one additional compound provides a cost effective intermediate for use in further processing, or function as a carrier for another compound (for example, an additional compound comprising 1233xf can be employed along with 244bb wherein less than 2.5% by weight of 1233xf does not negatively affect vapor phase dehydrochorination of 244bb).

The compositions disclosed herein comprising HFO-1234yf are useful as low global warming potential (GWP) heat transfer compositions, aerosol propellant, foaming agents, blowing agents, solvents, cleaning agents, carrier fluids, displacement drying agents, buffing abrasion agents, polymerization media, expansion agents for polyolefins and polyurethane, gaseous dielectrics, extinguishing agents, and fire suppression agents in liquid or gaseous form. By low GWP compositions, it is mean that the composition has an overall GWP of less than 750, less than 150, less than 10 and, in some cases, less than about 1. The disclosed compositions can act as a working fluid used to carry heat from a heat source to a heat sink. Such heat transfer compositions may also be useful as a refrigerant in a cycle wherein the fluid undergoes a phase change; that is, from a liquid to a gas and back or vice versa. Examples of heat transfer systems include but are not limited to air conditioners, freezers, refrigerators, heat pumps, water chillers, flooded evaporator chillers, direct expansion chillers, walk-in coolers, heat pumps, mobile refrigerators, mobile air conditioning units and combinations thereof.

As used herein, mobile refrigeration apparatus, mobile air conditioning or mobile heating apparatus refers to any refrigeration, air conditioner, or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "containers' (combined sea/land transport) as well as "swap bodies" (combined road/rail transport).

As used herein, stationary heat transfer systems are systems associated within or attached to buildings of any variety. These stationary applications may be stationary air conditioning and heat pumps (including but not limited to chillers, high temperature heat pumps, residential, commercial or industrial air conditioning systems, and including window, ductless, ducted, packaged terminal, chillers, and those exterior but connected to the building such as rooftop systems). In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigerator systems.

In one embodiment of the invention, the 1234yf containing composition is employed as a refrigerant and further comprises at least one lubricant. The lubricant component of the refrigerant compositions can comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and poly-alpha-olefins. Representative conventional lubricants of the present invention are the commercially available BVM 100 N (paraffinic mineral oil sold by BVA Oils), naphthenic mineral oil commercially available under the trademark from Suniso® 3GS and Suniso® 5GS by Crompton Co., naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500 and branched alkylbenzene, sold by Nippon Oil as HAB 22.

In another embodiment, the lubricant component of the present inventive refrigerant compositions can comprise those which have been designed for use with hydrofluorocarbon refrigerants and are miscible with refrigerants and inhibitors of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). Lubricants of the present invention are selected by considering a given compressor's requirements and the environment to which the lubricant will be exposed. The amount of lubricant can range from about 1% by weight to about 50% by weight, about 1 to about 20 and in some cases about 1 to about 3. In one particular embodiment, the foregoing refrigerant compositions are combined with a PAG lubricant for usage in an automotive A/C system having an internal combustion engine. In another particular embodiment, the foregoing refrigerant compositions are combined with a POE lubricant for usage in an automotive heat pump system having an electric or a hybrid electric drive train.

In one embodiment of the invention, the 1234yf containing composition further comprises an effective amount of at least one inhibitor. By "inhibitor" it is meant to refer to at least one compound in accordance with the present invention that reduces, if not eliminates, conversion of hydrofluoroolefins into oligomers or polymers. While oligomerization or homopolymerization reactions may be accelerated by relatively high temperatures, such reactions may also occur under ambient conditions depending upon the concentration and type of initiator (e.g., contaminant). The inhibitor can function as a radical inhibitor in order to stabilize the refrigerant and without affecting the refrigeration performance or compatibility of the refrigerant composition with refrigerant oil and parts. The stabilized refrigerant compositions may be useful in cooling systems and as replacements for existing refrigerants with higher global warming potential. Examples of suitable inhibitors comprise at least one member selected from the group consisting of hydrocarbons comprising cyclic monoterpenes terpenes; lipophilic organic compounds including tocopherol including α-Tocopherol; phenols, aromatic organic compounds having the chemical formula $C_6H_4(OH)_2$ including benzene-1,4-diol. In another embodiment of the invention when the 1234yf containing composition is employed as a refrigerant, an inhibitor is present in a liquid 1234yf containing composition as well as the lubricant as described in WO2019213004, WO2020222864, and WO2020222865; the disclosures of which are hereby incorporated by reference. The compositions may include any amount of inhibitor from 0.001 wt % up to 1 wt % of any of the stabilizers listed above, and, in most cases, preferably d-limonene.

In another embodiment of the invention, the inventive 1234yf containing composition is blended with at least one of hydrofluoroolelfins, hydroflurocarbons, hydrocarbons and carbon dioxide in order to obtain a refrigerant composition. In one aspect, refrigerant compositions comprise any of inventive foregoing HFO-1234yf containing compositions and at least one member selected from the group consisting of HFO-1234ze; HFC-32; HFC-125; HFC-32 and HFC-125; HFC-134a; HFC-152a; HFC-161, HFC-236fa; HFC-227ea; HFO-1225ye and HFC-32; HFO-1225ye and HFC-134a; HFO-1225ye, HFC-134a, and HFC-32; HFO-1225ye and HFO-1234yf; and HFO-1225ye, HFO-1225ye, HFO-1225ye and HFC-125. In another aspect, the refrigerant compositions comprise the compositions disclosed in U.S. patent Ser. No. 10/533,120 wherein any of the inventive foregoing HFO-123yf containing compositions are employed as the 1234yf component of the compositions disclosed in U.S. Pat. No. 10,533,120; the disclosure of which is hereby incorporated by reference. The amount of blended hydrofluoroolefins, hydrocarbons, hydrocarbons and carbon dioxide can range from about 1 to about 90 wt %, about 5 to about 75 wt. % and, in some cases, about 10 to about 50 wt. %. In one specific aspect, the inventive composition comprises at least one member selected from the group consisting of 1225zc, 1234ze, 1243zf, 1140, Z-1225ye, E-1225ye and HFC-134a wherein the total amount of the member is greater than 0 and less than 1; an amount of 32 that ranges from about 1 to about 60, about 5 to 70 and about 20 to 40 wt. %; and the remainder 1234yf. In another specific aspect, the inventive composition comprises at least one member selected from the group consisting of 1225zc, 1234ze, 1243zf, 1140, Z-1225ye, E-1225ye and HFC-134a wherein the total amount of the member is greater than 0 and less than 1; an amount of 32 that ranges from about 1 to about 70, about 5 to 70 and about 20 to 40 wt. %; an amount of 125 that ranges from 1 to about 70, about 5 to 70 and about 20 to 50 wt. %, and the remainder 1234yf. In another specific aspect, the inventive composition comprises at least one member selected from the group consisting of 1225zc, 1234ze, 1243zf, 1140, Z-1225ye, E-1225ye and HFC-134a wherein the total amount of the member is greater than 0 and less than 1; an amount of 161 that ranges from about 1 to 40, about 1 to 25 and about 1 to about 10 wt. %; and the remainder 1234yf.

In another embodiment, any of the foregoing inventive 1234yf compositions are blended with 1234ze. In one aspect, the composition comprises 1 to 99.5 wt. % of 1234yf or 1234ze and greater than 0 and less than 1 wt. % of at least one member selected from the group consisting of 1225zc, 1243zf, 1140, Z-1225ye, E-1225ye and HFC-134a. In one specific aspect, the composition comprises at least 98 to 99.9 wt. % 1234ze and typically, at least about 99.5% 1234ze and the remainder comprising 1234yf, 1225zc, 1234ze, 1243zf, 1140, Z-1225ye, E-1225ye and HFC-134a. The compounds making up the disclosed compositions are defined in Table 1.

TABLE 1

| Code | Structure | Chemical name |
| --- | --- | --- |
| CFC-13 | $CF_3Cl$ | chlorotrifluoromethane |
| HFC-23 | $CHF_3$ | trifluoromethane |
| HFC-32 | $CH2F2$ | Difluoromethane |
| HCFC-124 | $CF_3CHClF$ | 2-chloro-1,1,1,2-tetrafluoroethane |
| HCFC-125 | $CF_3CHF_2$ | pentafluoroethane |

TABLE 1-continued

| Code | Structure | Chemical name |
| --- | --- | --- |
| HCFC-133a | $CF_3CH_2Cl$ | 2-chloro-1,1,1-trifluoroethane |
| HFO-134 | $CHF_2CHF_2$ | 1,1,2,2-tetrafluoroethane |
| HFO-134a | $CF_3CH_2F$ | 1,1,1,2-tetrafluoroethane |
| HCFC-142b | $CClF_2CH_3$ | 1-chloro-1,1-difluoroethane |
| HFC-143a | $CF_3CH_3$ | 1,1,1-trifluoroethane |
| HFC-152a | $CHF_2CH_3$ | 1,1-difluoroethane |
| HFC-161 | $CH_3CH_2F$ | monofluoroethane |
| HFC-227ca | $CF_3CF_2CHF_2$ | 1,1,1,2,2,3,3-heptafluoropropane |
| HCFC-233ab | $CF_3CCl_2CH_2Cl$ | 1,2,2-trichloro-3,3,3-trifluoropropane |
| HCFC-234ab | $CF_3CCl_2CH_2F$ | 2,2-dichloro-1,1,1,3-tetrafluoropropane |
| HFC-236fa | $CF_3CH_2CF_3$ | 1,1,1,3,3,3-hexafluoropropane |
| HCFC-243fa | $CF_3CH_2CHCl_2$ | 3,3-dichloro-1,1,1-trifluoropropane |
| HCFC-243db | $CF_3CHClCH_2Cl$ | 2,3-dichloro-1,1,1-trifluoropropane |
| HCFC-244bb | $CF_3CFClCH_3$ | 2-chloro-1,1,1,2-tetrafluoropropane |
| HCFC-244cc | $CClF_2CF_2CH_3$ | 1-chloro-1,1,2,2-tetrafluoropropane |
| HCFC-244db | $CF_3CHClCH_2F$ | 2-chloro-1,1,1,3-tetrafluoropropane |
| HFC-245fa | $CF_3CH_2CHF_2$ | 1,1,1,3,3-pentafluoropropane |
| HFC-245cb | $CF_3CF_2CH_3$ | 1,1,1,2,2-pentafluoropropane |
| HFC-245eb | $CF_3CHFCH_2F$ | 1,1,1,2,3-pentafluoropropane |
| HCFC-253fb | $CF_3CH_2CH_2Cl$ | 3-chloro-1,1,1-trifluoropropane |
| HFC-254eb | $CF_3CHFCH_3$ | 1,1,1,2-tetrafluoropropane |
| HFC-254fb | $CF_3CH_2CH_2F$ | 1,1,1,3-tetrafluoropropane |
| HFC-347 isomers | $C_4H_3F_7$ | Heptafluorobutane |
| HFC-347mpy | $CF_3CF(CH_2F)CHF_2$ | 1,1,1,2,3,3-hexafluoro-2-(fluoromethyl)propane |
| HFC-347mef | $(CF_3CHFCH_2CF_3)$ | 1,1,1,2,4,4,4-heptafluorobutane |
| 1120 | $CCl_2=CHCl$ | trichloroethene |
| HCFO-1122 | $CHCl=CF_2$ | 2-chloro-1,1-difluoroethene |
| HCFO-1122a | $CHF=CFCl$ | 1-chloro-1,2-difluoroethene |
| HCO-1130 | $CHCl=CHCl$ | E- and/or Z-1,2-dichloroethene |
| HCO-1130a | $CCl_2=CH_2$ | 1,1-dichloroethene |
| HCFO-1131 | $CHF=CHCl$ | E- and/or Z-1-chloro-2-fluoroethene |
| HCFO-1131a | $CClF=CH_2$ | 1-chloro-1-fluoroethene |
| HCO-1140 | $CHCL=CH_2$ | Vinyl chloride |
| HFO-1141 | $CHF=CH_2$ | fluoroethene |
| 1150 | $CH_2=CH_2$ | Ethylene |
| HFP (FO-1216) | $CF_3CF=CF_2$ | Hexafluoropropene |
| HCFO-1223xd | $CF_3CCl=CHCl$ | 1,2-dichloro-1,1,1-trifluoropropene |
| HCFO-1223 | $C_3HCl_2F_3$ | Dichlorotrifluoropropene |
| HCFO-1233zd | $CF_3CH=CHCl$ | E- and/or Z-1-chloro-3,3,3-trifluoropropene |
| HCFO-1233xf | $CF_3CCl=CH_2$ | 2-chloro-1,1,1-trifluoropropene |
| HFO-1234yf | $CF_3CF=CH_2$ | 2,3,3,3-tetrafluoropropene |
| HFO-1234ze | $CF_3CH=CHF$ | E- and/or Z-1,3,3,3-tetrafluoropropene |
| HCFO-1242zf | $CClF_2CH=CH_2$ | 3-chloro-3,3-difluoropropene |
| HFO-1243zf | $CF_3CH=CH_2$ | 1,1,1-trifluoropropene (TFP) |
| HFO-1225zc | $CF_3CH=CF_2$ | 1,1,3,3,3-pentafluoropropene |
| HFO-1225ye | $CF_3CF=CHF$ | 1,2,3,3,3-pentafluoropropene |
| HFO-1336 | $C_4H_2F_6$ | E- and/or Z-hexafluorobutene |
| HCFO-1326 | $C_4HClF_6$ | Chlorohexafluorobutene |
| TFPY | $CF_3C\equiv CH$ | 3,3,3-trifluoropropyne |

Dehydrochlorination of HCFC-244bb Containing Compositions

In some embodiments, dehydrochlorination of HCFC-244bb is used to prepare HFO-1234yf. In one aspect of the invention, the inventive 244bb containing compositions are dehydrochlorinated to produce an HFO-1234yf containing composition.

In one embodiment, dehydrochlorination of the inventive HCFC-244bb containing compositions to HFO-1234yf is carried out in the vapor phase.

In one embodiment, vapor phase dehydrochlorination is carried out in the presence of catalyst. In one embodiment, the catalyst is selected from carbon and/or metal-based catalysts. In one embodiment, the catalyst may be selected from an activated carbon, a nickel-based catalyst, a palladium-based catalyst, or any combination of these catalysts. In one embodiment, the catalyst may be selected from the group consisting of Ni-mesh, palladium on carbon, palladium on aluminum oxide, or combinations thereof.

In one embodiment, the inventive HFO-1234yf containing composition is prepared by thermal dehydrochlorination of the inventive HCFC-244bb containing compositions. In one embodiment, this reaction occurs in the absence of a catalyst. In one embodiment, HCFC-244bb is introduced into one or more reaction vessels which temperature is maintained at a temperature high enough to affect the thermal dehydrochlorination of HCFC-244bb. In one embodiment, a plurality of reactors can be employed such as described in WO2020018764-A1, the disclosure of which is hereby incorporated by reference. In one embodiment, the temperature is high enough to affect the thermal dehydrochlorination of HCFC-244bb to a percent conversion of at least 5%, in some cases at least 10%, typically at least 15% and in some cases at least 25% (e.g., 5 to 10% conversion in each reactor when using a plurality of reactors). In another embodiment, the temperature is high enough to affect the thermal dehydrochlorination of HCFC-244bb to a percent conversion of at least 40%. In yet another embodiment, the temperature is high enough to affect the thermal dehydrochlorination of HCFC-244bb to a percent conversion of at least 80%. In yet another embodiment, the temperature is high enough to affect the thermal dehydrochlorination of HCFC-244bb to a percent conversion of at least 15%, in some cases at least 30%, 50% and 80% conversion for at least 12 hours of continuous operation. In one embodiment, unconverted 244bb can be separated from the 1234yf product and recycled to the reactor.

In one embodiment, the inventive HCFC-244bb containing compositions are introduced into a reaction vessel into a reaction vessel which temperature is maintained at a temperature in the range of from about 350 to about 550° C. and in some cases about 420 to about 520° C. In another embodiment, the temperature of the reaction vessel is maintained in the range from about 500° C. to about 650° C. In yet another embodiment, the temperature of the reaction vessel is maintained at a temperature high enough to affect the pyrolysis of HCFC-244bb to HFO-1234yf with a selectivity of 80% or greater. In yet another embodiment, the temperature of the reaction vessel is maintained at a temperature high enough to affect the pyrolysis of HCFC-244bb to HFO-1234yf with a selectivity of 85%, and in some cases about 95 to about 99% selectivity.

In one embodiment, the reaction zone is a reaction vessel comprised of materials which are resistant to corrosion. In one embodiment, these materials comprise alloys, such as nickel-based alloys such as Hastelloy®, nickel-chromium alloys commercially available from Special Metals Corp. under the trademark Inconel® (hereinafter "Inconel®") or nickel-copper alloys commercially available from Special Metals Corp. (New Hartford, N.Y.) under the trademark Monel, or vessels having fluoropolymers linings.

In one embodiment, the inventive HCFC-244bb containing compositions are preheated and vaporized in a vaporizer to a temperature of from about 30° C. to about 100° C. In another embodiment, the HCFC-244bb is preheated in a vaporizer to a temperature of from about 60° C. to about 90° C. The pressure can range from about 50 to about 150 psig and in some cases about 60 to about 110 psig. The 244bb vapor can be heated to the reactor temperature in one or more heat exchangers and/or with electric heaters. In one aspect of the embodiment, the hot effluent gas from the reactor(s) can be used to heat the 244bb feed gas.

In some embodiments, a diluent gas is used as a carrier gas for HCFC-244bb. In one embodiment, the carrier gas is selected from nitrogen, argon, helium or carbon dioxide. In one aspect of this embodiment, HCl that was provided as a reaction product is employed as a diluent gas.

Another embodiment of the invention relates to storing the foregoing 1234yf containing compositions in gaseous and/or liquid phases within a sealed container wherein the oxygen and/or water concentration in the gas and/or liquid phases ranges from about 3 vol ppm to less than about 3,000 vol ppm at a temperature of about 25° C., about 5 vol ppm to less than about 150 vol ppm and in some cases about 5 vol ppm to less than about 75 vol ppm. In an aspect of this embodiment, the refrigerant comprises the inventive 1234yf containing compositions and, in a further aspect, the refrigerant composition further comprises greater than about 0 and less than 1 wt. % of any combination of the foregoing additional compounds.

The container for storing the foregoing compositions can be constructed of any suitable material and design that is capable of sealing the compositions therein while maintaining gaseous and liquids phases. Examples of suitable containers comprise pressure resistant containers such as a tank, a filling cylinder, and a secondary filing cylinder. The container can be constructed from any suitable material such as carbon steel, manganese steel, chromium-molybdenum steel, among other low-alloy steels, stainless steel and in some case an aluminum alloy. The 1234yf containing compositions stored in these containers can be transferred to a heat transfer system and in turned used as a working fluid.

Without wishing to be bound by any theory or explanation, it is believed that one skilled in the art can, using the description herein, utilize the present invention to its fullest extent. The following specific embodiments are, therefore, to be construed as merely illustrative, and do not constrain the remainder of the disclosure or appended claims in any way whatsoever. The following Examples illustrate certain embodiments and aspects of the invention and shall not limit the scope of the appended claims.

EXAMPLES

General Procedure for Product Analysis

The following general procedure is illustrative of the method used for analyzing the products of fluorination reactions. Other methods can be used for analyzing fluorochemical compositions so long as the method is capable of adequately separating components of the composition and detecting the separated components as well as resolving potentially overlapping signals for the detected components. Part of the total reactor effluent was sampled for organic product analysis using a gas chromatograph equipped with a Flame Ionization Detector (FID) and/or Mass Spectrometer Detector (GC/MS) detectors. The gas chromatography utilized two GC columns, RTX-1 and Gaspro columns.

Example 1

A 244bb composition was analyzed using the foregoing product analysis. The results of the analysis are listed below in Table 1.

TABLE 1

244bb Starting Material
(all ppmw except 244bb is wt %)
Example

| Compound | A | B | C |
|---|---|---|---|
| 1120 | 0 | 0 | 10 |
| 1334 | 110 | 0 | 10 |
| HCFC-244CC | 370 | 110 | 40 |
| HCFO-1233XF | 6220 | 25460 | 5620 |
| HFC-245CB | 0 | 0 | 0 |
| 1223xd | 1060 | 100 | 0 |
| 1224 Isomer | 1630 | 1170 | 290 |
| 1233xfB | 0 | 0 | 0 |
| 225ba | 240 | 0 | 0 |
| 226ca | 40 | 0 | 0 |
| 233ab | 180 | 0 | 0 |
| 233da | 210 | 0 | 0 |
| 234bb | 1260 | 0 | 0 |
| 234da | 0 | 0 | 0 |
| 234da isomer | 90 | 0 | 0 |
| 235ca | 250 | 100 | 30 |
| 235da | 900 | 50 | 10 |
| 235ea | 30 | 40 | 10 |
| 243ab | 2270 | 60 | 290 |
| 243db | 3060 | 160 | 50 |
| 244db | 120 | 0 | 0 |
| 244eb | 330 | 80 | 30 |
| 253db | 0 | 30 | 20 |
| 253fb | 1040 | 80 | 80 |
| E-1224yd | 200 | 290 | 120 |
| HCFO-1233zd | 0 | 5760 | 0 |
| HFC-235cb | 590 | 110 | 10 |
| HFC-245fa | 0 | 0 | 0 |
| HFC-254EB | 0 | 0 | 0 |
| Z-1224yd | 6310 | 110 | 3020 |

TABLE 1-continued

244bb Starting Material
(all ppmw except 244bb is wt %)
Example

| Compound | A | B | C |
|---|---|---|---|
| Total Others | 1560 | 1710 | 690 |
| HCFC-244BB | 97.193 | 96.459 | 98.969 |

The HCFC-244bb containing composition of this Example is produced by: i) hydrofluorinating 1233xf in the liquid phase using an antimony catalyst; and ii) purification to remove unreacted HF and organic byproducts. The purified product 244bb was stored in a vessel and samples were taken from the vessel for analysis.

Example 2

The compositions of Example 1 were converted to HFO-1234yf by vaporizing liquid 244bb from the storage vessel, further heating the vaporized 244bb to reaction temperature, then feeding to the reactor system where dehydrochlorination occurred to produce an HFO-1234yf containing composition. Liquid 244bb was recycled and combined with the 244bb from the storage vessel before the vaporizer. The composition was analyzed in accordance with the foregoing product analysis. The process was operated continuously and the feed and product compositions in Tables 1 and 2, respectively, were analyzed contemporaneously. The results of the HFO-1234yf containing composition analysis are listed below in Table 2.

TABLE 2

1234yf Product
(all ppmw except 1234yf is %)
Example

| | A | B | C |
|---|---|---|---|
| HCFC-244BB | 8.49 | 0 | 0 |
| HCFC-244CC | 0 | 0 | 0 |
| HCFO-1233XF | 0 | 0 | 0 |
| HFC-245CB | 9.91 | 9.86 | 0 |

TABLE 2-continued

1234yf Product
(all ppmw except 1234yf is %)
Example

| | A | B | C |
|---|---|---|---|
| 254eb | 0.53 | 3.69 | 5.79 |
| 3,3,3-Trifluoropropyne | 0 | 0 | 0 |
| 347MPY | 0 | 0 | 0 |
| CFC-12 | 5.65 | 4.09 | 4.54 |
| HCC-1140 | 4.22 | 6.67 | 0 |
| HCC-40 | 0 | 0 | 0 |
| HCFC-1122 | 3 | 18 | 1 |
| 1122a-Z | 27 | 0 | 3 |
| 1122a-E | 0 | 0 | 1 |
| HCFC-124 | 19.26 | 29.37 | 14.14 |
| HCFC-142b | 15 | 19 | 8 |
| HCFC-151a | 3 | 1 | 1 |
| HCFO-1232XF | 0 | 0 | 0 |
| HCO-1230XA | 0 | 0 | 0 |
| HFC-1131 cis | 0 | 0 | 0 |
| HFC-1131 trans | 0 | 0 | 0 |
| HFC-1131A | 0 | 0 | 0 |
| HFC-1225ye-E | 17 | 11 | 2 |
| HFC-1225ye-Z | 86 | 55 | 11 |
| HFC-1243zf | 508.95 | 80.69 | 39.7 |
| HFC-134A | 231.95 | 233.77 | 262.11 |
| HFC-152a | 0 | 0 | 0 |
| HFO-1225zc | 0 | 86 | 26 |
| HFO-1234ze | 260.17 | 366.98 | 273.95 |
| HFP | 2 | 2 | 1 |
| PFC-218 | 0 | 0 | 0 |
| Total Others | 728 | 12 | 6 |
| HFO-1234yf | 99.807 | 99.906 | 99.934 |

Example 3

The refrigeration performance of the HFO-1234yf containing composition produced by Example 2 was evaluated using ThermPy Cycle Conditions (ThermPy is a refrigerant performance program based on Refprop 10). The results of the evaluation are given below in Table 3.

ThermPy Cycle Conditions—Medium Temp Refrigeration
  Condenser Temp=40° C.
  Evaporator Temp=−7° C.
  Subcool Amount=0K
  Return Gas Temp=18° C.
  Isentropic Efficiency=70%

TABLE 3

| | ppmw (except 1234yf in wt %) | | | | | | | |
|---|---|---|---|---|---|---|---|---|
| | 1234yf | 1225zc | 1234zeE | 1243zf | 1140 | 1225yeZ | 1225yeE | 134a |
| Pure 1234yf Example | 100% | | | | | | | |
| A | 99.8745 | 1 | 280 | 617 | 4 | 138 | 22 | 193 |
| B | 99.8728 | 143 | 634 | 142 | 8 | 88 | 16 | 241 |
| C | 99.9435 | 21 | 271 | 32 | 1 | 2 | 1 | 237 |

| | Evap P (kPa) | Cond P (kPa) | Comp Disch T(C) | Average Glide (K) | Capacity | Capacity Rel to 1234yf (%) | COP | COP Rel to 1234yf (%) |
|---|---|---|---|---|---|---|---|---|
| Pure 1234yf Example | 247 | 1018 | 71.4 | 0 | 1570 | 100.0% | 3.087 | 100.0% |
| A | 247 | 1018 | 71.5 | 0 | 1570 | 100.0% | 3.087 | 100.0% |
| B | 247 | 1018 | 71.5 | 0 | 1569 | 99.9% | 3.088 | 100.0% |
| C | 247 | 1018 | 71.5 | 0 | 1570 | 100.0% | 3.087 | 100.0% |

Table 3 illustrates that compositions of the invention are suitable for use as a refrigerant. Table 3 further illustrates that the inventive compositions possess a refrigeration performance that is commensurate with HFO-1234yf. Accordingly, the inventive compositions are suitable for replacing relatively pure HFO-1234yf.

Example 4

The refrigeration performance of the HFO-1234yf containing composition produced by Example 2 which were blended with 32 was evaluated using ThermPy Cycle Conditions (ThermPy is a refrigerant performance program based on Refprop 10). The results of the evaluation are given below in Tables 4, 5 and 6.

ThermPy Cycle Conditions—Air Conditioning
  Condenser Temp=46.1° C.
  Evaporator Temp=10° C.
  Subcool Amount=8.3K
  Superheat Amount=11.1K
  Isentropic Efficiency=70%

TABLE 4

| | ppmw (except 32 and 1234yf in wt %) | | | | | | | | |
|---|---|---|---|---|---|---|---|---|---|
| | R32 | 1234yf | 1225zc | 1234zeE | 1243zf | 1140 | 1225yeZ | 1225yeE | 134a |
| R-454B Example | 68.9% | 31.1% | | | | | | | |
| A1 | 68.9% | 31.0610 | 0 | 87 | 192 | 1 | 43 | 7 | 60 |
| B1 | 68.9% | 31.0604 | 45 | 197 | 44 | 3 | 27 | 5 | 75 |
| C1 | 68.9% | 31.0825 | 7 | 84 | 10 | 0 | 0 | 0 | 74 |

| | Evap P (kPa) | Cond P (kPa) | Comp Disch T(C) | Average Glide (K) | Capacity | Capacity Rel to R-454B (%) | COP | COP Rel to R-454B (%) |
|---|---|---|---|---|---|---|---|---|
| R-454B Example | 1010 | 2615 | 87.3 | 1.2 | 6512 | 100.0% | 4.526 | 100.0% |
| A1 | 1010 | 2614 | 87.3 | 1.2 | 6511 | 100.0% | 4.526 | 100.0% |
| B1 | 1010 | 2615 | 87.3 | 1.2 | 6512 | 100.0% | 4.526 | 100.0% |
| C1 | 1010 | 2615 | 87.3 | 1.2 | 6512 | 100.0% | 4.526 | 100.0% |

ThermPy Cycle Conditions—Medium Temp Refrigeration
  Condenser Temp=40° C.
  Evaporator Temp=−7° C.
  Subcool Amount=0K
  Return Gas Temp=18° C.
  Isentropic Efficiency=70%

TABLE 5

| | ppmw (except 32 and 1234yf in wt %) | | | | | | | | |
|---|---|---|---|---|---|---|---|---|---|
| | R32 | 1234yf | 1225zc | 1234zeE | 1243zf | 1140 | 1225yeZ | 1225yeE | 134a |
| R-454A | 35.0% | 65.0% | | | | | | | |
| A2 | 35.0% | 64.9179 | 1 | 183 | 405 | 3 | 90 | 14 | 125 |
| B2 | 35.0% | 64.9174 | 93 | 412 | 92 | 5 | 57 | 10 | 157 |
| C2 | 35.0% | 64.9632 | 14 | 176 | 21 | 1 | 1 | 1 | 154 |

| | Evap P (kPa) | Cond P (kPa) | Comp Disch T(C) | Average Glide (K) | Capacity | Capacity Rel to R-454A (%) | COP | COP Rel to R-454A (%) |
|---|---|---|---|---|---|---|---|---|
| R-454A | 465 | 1840 | 92.2 | 4.7 | 2839 | 100.0% | 2.967 | 100.0% |
| A2 | 465 | 1840 | 92.3 | 4.7 | 2838 | 100.0% | 2.967 | 100.0% |
| B2 | 465 | 1840 | 92.3 | 4.7 | 2838 | 100.0% | 2.967 | 100.0% |
| C2 | 465 | 1840 | 92.3 | 4.7 | 2838 | 100.0% | 2.967 | 100.0% |

ThermPy Cycle Conditions—Medium Temp Refrigeration
  Condenser Temp=40° C.
  Evaporator Temp=-7° C.
  Subcool Amount=0K
  Return Gas Temp=18° C.
  Isentropic Efficiency=70%

TABLE 6

| | ppmw (except 32 and 1234yf in wt %) | | | | | | | | |
|---|---|---|---|---|---|---|---|---|---|
| | R32 | 1234yf | 1225zc | 1234zeE | 1243zf | 1140 | 1225yeZ | 1225yeE | 134a |
| R-454C | 21.5% | 78.5% | | | | | | | |
| A3 | 21.5% | 78.4015 | 1 | 220 | 484 | 3 | 108 | 17 | 152 |
| B3 | 21.5% | 78.3970 | 143 | 498 | 112 | 6 | 69 | 13 | 189 |
| C3 | 21.5% | 78.4551 | 21 | 213 | 25 | 1 | 2 | 1 | 186 |

| | Evap P (kPa) | Cond P (kPa) | Comp Disch T(C) | Average Glide (K) | Capacity | Capacity Rel to R-454C (%) | COP | COP Rel to R-454C (%) |
|---|---|---|---|---|---|---|---|---|
| R-454C | 391 | 1590 | 85.1 | 6.1 | 2429 | 100.0% | 2.999 | 100.0% |
| A3 | 391 | 1590 | 85.2 | 6.1 | 2429 | 100.0% | 2.999 | 100.0% |
| B3 | 391 | 1590 | 85.2 | 6.1 | 2429 | 100.0% | 2.999 | 100.0% |
| C3 | 391 | 1590 | 85.2 | 6.1 | 2429 | 100.0% | 2.999 | 100.0% |

Tables 4, 5 and 6 illustrate that compositions of the invention are suitable for blending with 32 in order to obtain a useful refrigerant.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The following is claimed:

1. A composition comprising 1234yf, 1225zc, 1234ze, 1243zf, 1140, Z-1225ye, E-1225ye, and HFC-134a.

2. The composition of claim 1 further comprising at least one additional compound comprising at least one member selected from the group consisting of 1131a, 244bb, 1233xf, 244cc, 1224yd, HFP, 1122, 1122a, 12, E-1131, Z-1131, 245cb, 3,3,3-trifluoropropyne, 124, 142b, 254eb, 347 isomers and combinations thereof.

3. The composition of claim 2 wherein the at least one additional compound further comprises at least one additional compound comprising at least one member selected from the group consisting of HFC-245cb, CFC-12, HFC-254eb, HCFC-1122, HCFC-124, HCFC-142b, HCFC-151a, HFC-152a, 3,3,3-trifluoropropyne, 1122a-Z and combinations thereof.

4. The composition of claim 2 wherein the at least one additional compound further comprises at least one additional compound comprising at least one member selected from the group consisting of HCFC-243db, HCFC-244db, HFC-245cb, HFC-245fa, HCFO-1233xf, HCFO-1233zd, HCFC-253fb, HCFC-234ab, HCFC-243fa, ethylene, HFC-23, CFC-13, HFC-143a, HFC-152a, , HFC-236fa, HCO-1130, HCO-1130a, HFO-1336, HCFC-133a, HCFC-254fb, HCFC-1131, HFC-1141, HCFO-1242zf, HCFO-1223xd, HCFC-233ab, HCFC-226ba, HFC-227ca and combinations thereof.

5. The composition of claim 1 further comprising at least one additional compound comprising at least one member selected from the group consisting of HFC-245cb, CFC-12, HFC-254eb, HCFC-1122, HCFC-124, HCFC-142b, HCFC-151a, HFC-152a, 3,3,3-trifluoropropyne, 1122a-Z and combinations thereof.

6. The composition of claim 1 further comprising at least one additional compound comprising at least one additional compound selected from the group consisting of HCFC-243db, HCFC-244db, HFC-245cb, HFC-245fa, HCFO-1233xf, HCFO-1233zd, HCFC-253fb, HCFC-234ab, HCFC-243fa, ethylene, HFC-23, CFC-13, HFC-143a, HFC-152a, HFC-236fa, HCO-1130, HCO-1130a, HFO-1336, HCFC-133a, HCFC-254fb, HCFC-1131, HFC-1141, HCFO-1242zf, HCFO-1223xd, HCFC-233ab, HCFC-226ba, HFC-227ca and combinations thereof.

7. The composition of claim 1 wherein the total amount of 1225zc, 1234ze, 1243zf, 1140, Z-1225ye, E-1225ye, and HFC-134a is greater than zero and less than 1 wt. %.

8. The composition of claim 7 further comprising at least one member selected from the group consisting of 32, 125 and 161.

9. The composition of claim 8 wherein the composition comprises 32 in an amount from about 5 to about 70 wt. % based on a total weight of the composition.

10. The composition of claim 8 wherein the composition comprises 161 in an amount from about 1 to about 10 wt. % based on a total weight of the composition.

11. The composition of claim 8 wherein the composition comprises 125 in an amount from about 5 to about 70 wt. % based on a total weight of the composition.

12. The composition of claim 1 wherein the 347 isomers comprise at least one member selected from the group consisting of 347mpy and 347mef.

13. A method for making the composition of claim 1 comprising reacting a composition comprising HCFC-244bb and at least one additional compound selected from the group consisting of 1120, 1334, 244cc, 1233xf, 1223xd, 1224, 225ba, 226ca, 233ab, 233da, 234bb, 234da, 235ca, 235da, 235ea, 243ab, 243db, 244db, 244eb, 253db, 253fb, 1224yd-E, 1233zd, 235cb, and 1224yd-Z, 1326, 1223 isomers and combinations thereof.

14. The method of claim 13 wherein the reacting comprises a dehydrochlorination reaction.

15. A refrigerant composition comprising the composition of claim 1 and at least one lubricant.

16. A method for transferring heat comprising using the refrigerant composition of claim 15 as a working fluid in a heat transfer system.

17. The method of claim 16 wherein heat transfer systems comprise at least one member selected from the group consisting of air conditioners, freezers, refrigerators, heat pumps, water chillers, flooded evaporator chillers, direct expansion chillers, walk-in coolers, heat pumps, mobile refrigerators, mobile air conditioning units and combinations thereof.

18. A container comprising gaseous and liquid phases of the composition of claim 1 wherein the amount of oxygen and water concentration in the gas and liquid phases ranges from about 3 vol ppm to less than about 3,000 vol ppm at a temperature of about 25 C.

* * * * *